United States Patent [19]

Bogdanski

[11] Patent Number: 4,703,379
[45] Date of Patent: Oct. 27, 1987

[54] HARD DISK DRIVE WITH ERASING APPARATUS

[75] Inventor: Michael Bogdanski, Salzkotten, Fed. Rep. of Germany

[73] Assignee: Nixdorf Computer AG, Paderborn, Fed. Rep. of Germany

[21] Appl. No.: 12,692

[22] Filed: Feb. 9, 1987

Related U.S. Application Data

[63] Continuation of Ser. No. 661,411, Oct. 16, 1984, abandoned.

[30] Foreign Application Priority Data

Oct. 18, 1983 [DE] Fed. Rep. of Germany ....... 3337845

[51] Int. Cl.$^4$ .............................................. G11B 5/024
[52] U.S. Cl. .................................... 360/118; 360/103; 360/99
[58] Field of Search ........ 360/118, 102, 103, 104–106, 360/97–99

[56] References Cited

U.S. PATENT DOCUMENTS

| 2,766,328 | 10/1956 | Handschin et al. | 360/118 |
| 3,214,175 | 10/1965 | Nakamatsu | 360/118 |
| 3,710,357 | 1/1973 | Buslik | 360/97 |
| 3,918,089 | 11/1975 | Kato et al. | 360/118 |
| 4,063,296 | 12/1977 | Fremstedal et al. | 360/118 |
| 4,188,648 | 2/1980 | Guerini | 360/105 |
| 4,462,055 | 7/1984 | Jackson et al. | 360/118 |
| 4,521,819 | 6/1985 | Esling et al. | 360/97 |

FOREIGN PATENT DOCUMENTS

| 224982 | 12/1958 | Australia | 360/118 |
| 1039250 | 9/1952 | Fed. Rep. of Germany | 360/118 |
| 2264029 | 7/1974 | Fed. Rep. of Germany | 360/98 |
| 2716587 | 10/1978 | Fed. Rep. of Germany | 360/118 |
| 54-128308 | 10/1979 | Japan | 360/104 |
| 1218515 | 1/1971 | United Kingdom | 360/97 |

Primary Examiner—John H. Wolff
Assistant Examiner—Matthew J. Bussan
Attorney, Agent, or Firm—Cullen, Sloman, Cantor, Grauer, Scott & Rutherford

[57] ABSTRACT

In a hard disk drive with a closed housing (10) enclosing a magnetic disk pack (24,26) and a carrier arrangement (32) for magnetic heads (36), permanent-magnet or electromagnetic erase heads (44,62) are arranged in this which can be operated independently of the magnetic heads (36).

8 Claims, 3 Drawing Figures

HARD DISK DRIVE WITH ERASING APPARATUS

This is a continuation of co-pending application Ser. No. 611,411 filed on Oct. 16, 1984, now abandoned.

FIELD OF THE INVENTION

The invention relates to a hard disk drive with a closed housing surrounding at least one drivable magnetic disk and a carrier arrangement for electromagnetic write or read heads (designated in the following as magnetic heads) which are movable relative to the magnetic disk.

BACKGROUND AND SUMMARY OF THE INVENTION

In a hard disk drive of this type the magnetic disk or the disk pack, the carrier arrangement for the magnetic heads and if necessary the disk driving mechanism are completely encased in order to prevent the penetration of contaminations into the disk drive. This means that the user of the disk drive cannot remove the magnetic disks. In the case of repairs on the hard disk drive, the latter must be shipped as a whole to the manufacturer or the repair service, in which case the magnetic disks must necessarily be handed over to the manufacturer or the repair service. Since the most frequent defects in disk drives concern precisely the electronic components, the user in this case often no longer has the capability of affecting the information stored on the disks by the use of magnetic heads in the normal way. However, here the possibility exists under some circumstances that during or after the repair of the disk drive unauthorized persons may be able to read information stored on the disks.

For this reason, the invention is based on the problem of ensuring, for a hard disk drive of the type mentioned at the start, that even in the case of a failure of the disk drive the capability still exists of preventing unauthorized persons from having access to the information stored on the magnetic disk.

This problem is solved according to the invention by having at least one permanent-magnet or electromagnetic erase head arranged in the housing which head can operate independently of the magnetic heads. According to a first embodiment example the erase head is arranged on an erase arm which is movable relative to the magnetic disk. Theoretically, an electromagnetic erase head could also remain in a stationary position relative to the magnetic disk, since it becomes active only through being energized with current. Since however, the airflow conditions in the disk region are disturbed by the erase head and the erase arm, it is expedient for the erase head to be able to be removed from the disk region in normal operation. It is advantageous for the erase arm to be pivotable on the housing around a pivoting axis aligned parallel to the magnetic disk axis. For this, the erase arm may be movable manually or by motor.

In a disk drive with a disk pack including a plurality of disks, the erase heads can be swung in between the magnetic disks, one erase head being provided per disk surface. For a plurality of magnetic disks, the arrangement may also be made such that only part of the disk surface is assigned to one particular erase head. This offers the capability, for example, of storing sevice information on one or two disk surfaces of the pack which is required for a test run of the disk drive and hence is not to be erased. However, the arrangement can also be made such that the erase head in its erase position extends over only a part of the magnetic disk surface, so that the service information mentioned can be stored on the region of the disk not covered by the erase head.

When an air conduction comb is assigned to the disk pack, as will be described in detail below on the basis of FIG. 2, then according to a second embodiment example the erase heads may also be arranged on fingers or teeth of the air conduction comb engaging between the magnetic disks.

According to a third embodiment example, finally, the erase heads can also be arranged directly on the carrier arms for the read/write heads and next to the latter. This has the advantage that the erase heads require no carrier arrangement of their own when this carrier is not present as such, for example, if it is present in the form of the air conduction comb.

In order to make erasing possible even in the case of a failure of the magnetic disk drive, it may be provided that the magnetic disk is rotatable manually by at least 360°. This can be done with the use of a key or a tool.

In order to prevent any unintentional erasing of the information stored on the disks, it is expedient for the erase arm to be lockable in its rest position. For an electromagnetic erase head, the switching-on mechanism for the erase head may be lockable. The locking here may be done with a lock, so that only the possessor of the key can erase the information with the aid of an additional erase unit and thus he retains control over the erase process. In order to prevent any malfunction of the disk drive, the locking of the erase heads may be coupled with the regulating device for the magnetic heads in such a way that unlocking is possible only in the rest position of the magnetic heads.

Besides the capability of making the stored information unreadable without the use of an operative read/write unit and thus deny access to unauthorized persons, the solution according to the invention also offers another advantege. When a disk drive must be taken apart because of a defect, it need not necessarily be returned to the user. It is immediately replaced by a serviceable disk drive. The service organization need not be concerned about the stored information and if necessary can install the repaired disk drive without difficulty for another user. Formerly this would have been possible only if the service organization after repairing the defective disk drive had made the stored information unusable through time-consuming overwriting.

Further features and advantages are seen from the following description, which in connection with the annexed drawings will explain the invention on the basis of embodiment examples. In these:

DETAILED DESCRIPTION OF THE PREFERRED EMBODIMENT

Figure 1:
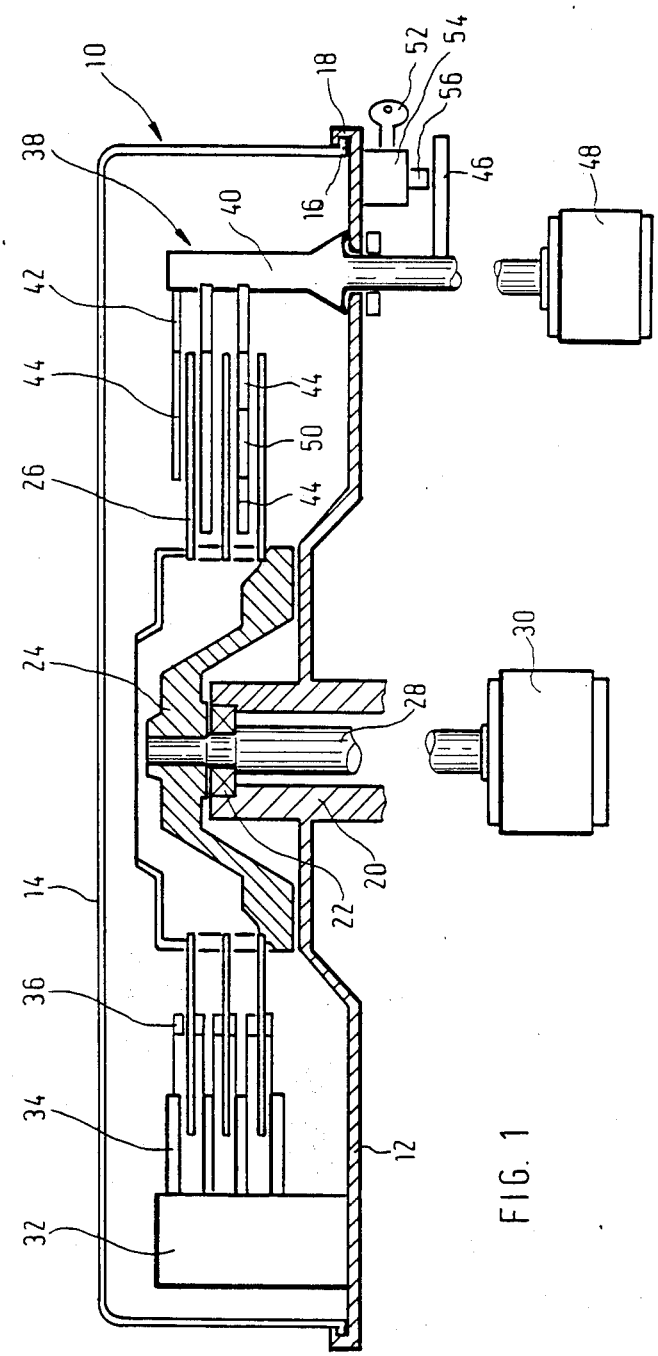
FIG. 1 shows a diagrammatic section, containing the disk spindle, through a hard disk drive according to the invention.

The hard disk drive represented in FIG. 1, includes a housing, designated in general as 10, with a housing bottom 12 and a cup-shaped housing cap 14 which with its edge 16 directed radially outward grips an annular catch 18 on the bottom 12 of the housing, so that the housing 10 is closed off dust-tight.

In a tubular extension 20 of the housing bottom 12, a disk carrier 24 for magnetic disks 26 is pivoted by means of a bearing 22, which carrier can be driven by a shaft 28 running coaxially out of the housing 10 in the tube 20, by means of an electric motor 30. A clutch, not represented, is provided between the shaft 28 and the electric motor 30, so that the disk drive as a whole can be detached from the unit containing the driving motor 30. In other embodiments of a hard disk drive, the driving motor for the disk pack 24,26 can also be built into the housing 10. The embodiment represented in FIG. 1 has the advantage that the disk pack can be rotated by hand without difficulty after the disk drive is removed.

In FIG. 1 to the left of the disk pack 24,26, a carrier and regulating device 32 for carrier arms 34 is diagrammatically denoted, on which magnetic heads 36 constructed as write and/or read heads assigned to the disk surfaces are fastened. With the use of the regulating device 32 these magnetic heads 36 can be moved over the whole respective surface in order to record or read information in a known manner on the respective surface. The disk drive described thus far is known in itself and therefore need not be explained in more detail.

In case of a failure of the mechanical parts and/or electronic components of the hard disk drive, the latter as a whole is delivered to the manufacturer or to a repair enterprise. In order to erase the information stored on the magnetic disks 26 quickly, covering its whole area, or make it unreadable, in this case, an erase arrangement designated in general as 28 is provided in the right half of the housing 10 as seen in FIG. 1. It includes a shaft 40 supported in the bottom 12 of the housing and onto which shaft the erase arms 42 are fastened with axial spacings corresponding to the disk spacings, which arms carry permanent magnets or elecromagnets 44. The shaft 40 may be driven in rotation manually by the use of a lever 46 fastened onto it outside of the housing 10 and/or by motor by the use of a driving motor 48, where the shaft 40 can likewise be joined rotationally fixed with the shaft of the driving motor 48 by means of a clutch (or coupling—Trans 1.) not represented. The shaft 40 is thus movable between the erase position represented in FIG. 1, in which the magnets 44 extend over the disk surface, and a rest position, not represented, in which the erase arms 42 and the magnets 44 are swung out of the region of the disks.

Basically, the respective magnet 44 extends over the whole region of the disk usable for the storing of information, as is the case with the central erase arm 42 which is swung in between the two upper magnetic disks 26. However, when certain information on the disk pack is not to be erased, such as service information for example which is necessary for testing the disk drive, then depending on the type of this information and where and how it is stored, either an erase arm can be eliminated entirely, as is represented for the bottom side of the bottommost magnetic disk 26, as is represented for the topmost and for the bottommost erase arm 42. The magnet 44 arranged on the top erase arm 42 does not reach the radially innermost region of the surface of the magnetic disk. Information can be stored in this region which is not erasable with the erase arrangement 38. Both a permanent magnet and an electromagnet can be used at this position. Two magnets 44 separated by a middle magnet-free region 50 are arranged on the bottommost erase arm 42, so that in this case a radially middle region of the magnetic disk surface cannot be erased. In this case, however, only electromagnets can be used, since with the use of permanent magnets the permanent magnet 44 which is radially outward with respect to the shaft 40 would sweep over the whole surface region when the erase arm 42 is swung in between the magnetic disks 26.

On the underside of the housing bottom 12, a lock 54 which can be operated with a key 52 is diagrammatically represented, the bolt 56 of which can protrude in the path of the lever 46, so that the erase arrangement 38 can be locked in its rest position. For this purpose the lock 54 in itself must be arranged displaced by 90° with respect to the shaft 40. The position of the lock 54 represented was chosen only for reasons of illustration. Thus, the erase arrangement is secured against any unintentional or unauthorized actuation, so that only an authorized person possessing a key can erase information stored on the magnetic disks 26 by the use of the erase arrangement 38.

For the case where the magnets 44 are formed by electronmagnets, a corresponding locking unit can also be provided on the switching-on device for the electromagnets, so that these can be switched on only after the lock 54 is unlocked.

It is understood that the different embodiments for the magnets 44 as represented in FIGURE 1 need not all be present in one and the same disk drive, but rather are represented on the same figure for reasons of illustration.

Figure 2:
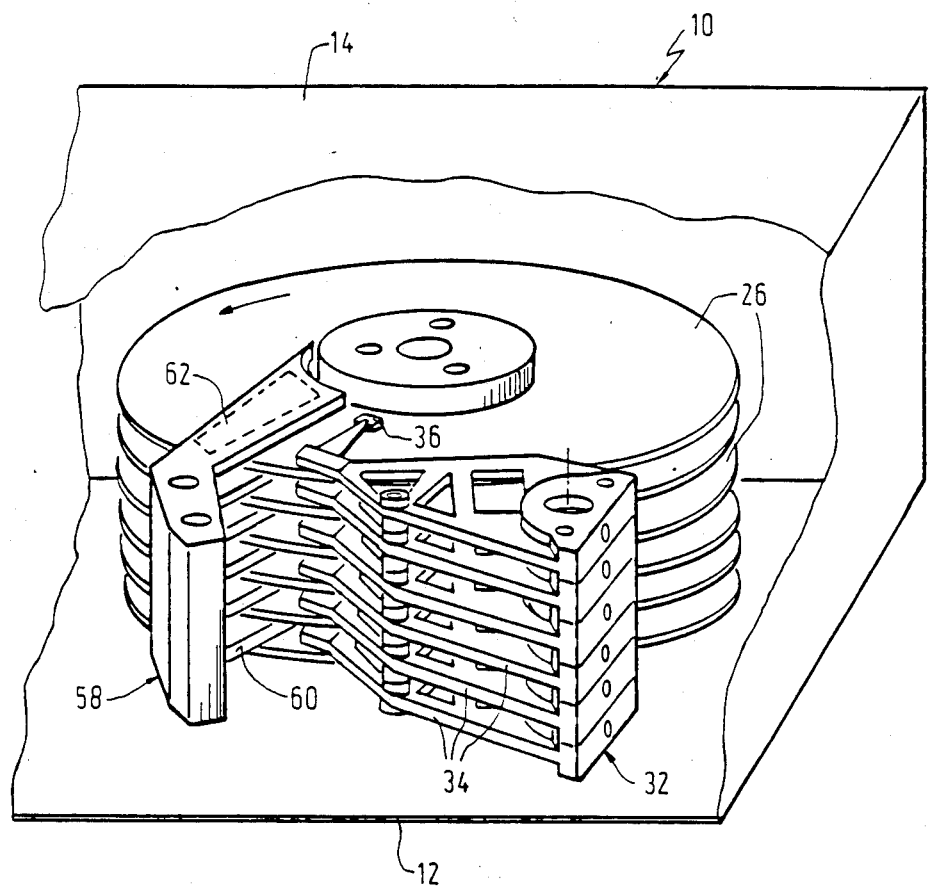
FIG. 2 shows a diagrammatic perspective partial representation of a hard disk drive with an air conduction comb.

In the embodiment represented in FIG. 2 the same parts are designated by the same reference numbers as in FIG. 1. In contrast, to the embodiment according to FIG. 1, in the embodiment according to FIG. 2 a stationary air conduction comb 58 is arranged in front of the magnetic heads 36 in the direction of rotation, the comb fingers 60 of which extend in dovetailing radially inward, between the magnetic disks 26. The air conduction comb 58 has the task of deflecting in the direction of a filter the air carried along by the rotating disk pack and thereby of preventing dust and frictional particles from reaching the sensitive magnetic heads 36. The comb fingers 60 may then be advantageously used for holding activatable erase coils 62, as is denoted diagrammatically in FIG. 2, where in the present case the erase coil is embedded in the comb finger 60. The erase coils may also be arranged on the comb fingers. In this case, therefore, any support of their own for the erase coils can be eliminated.

Figure 3:
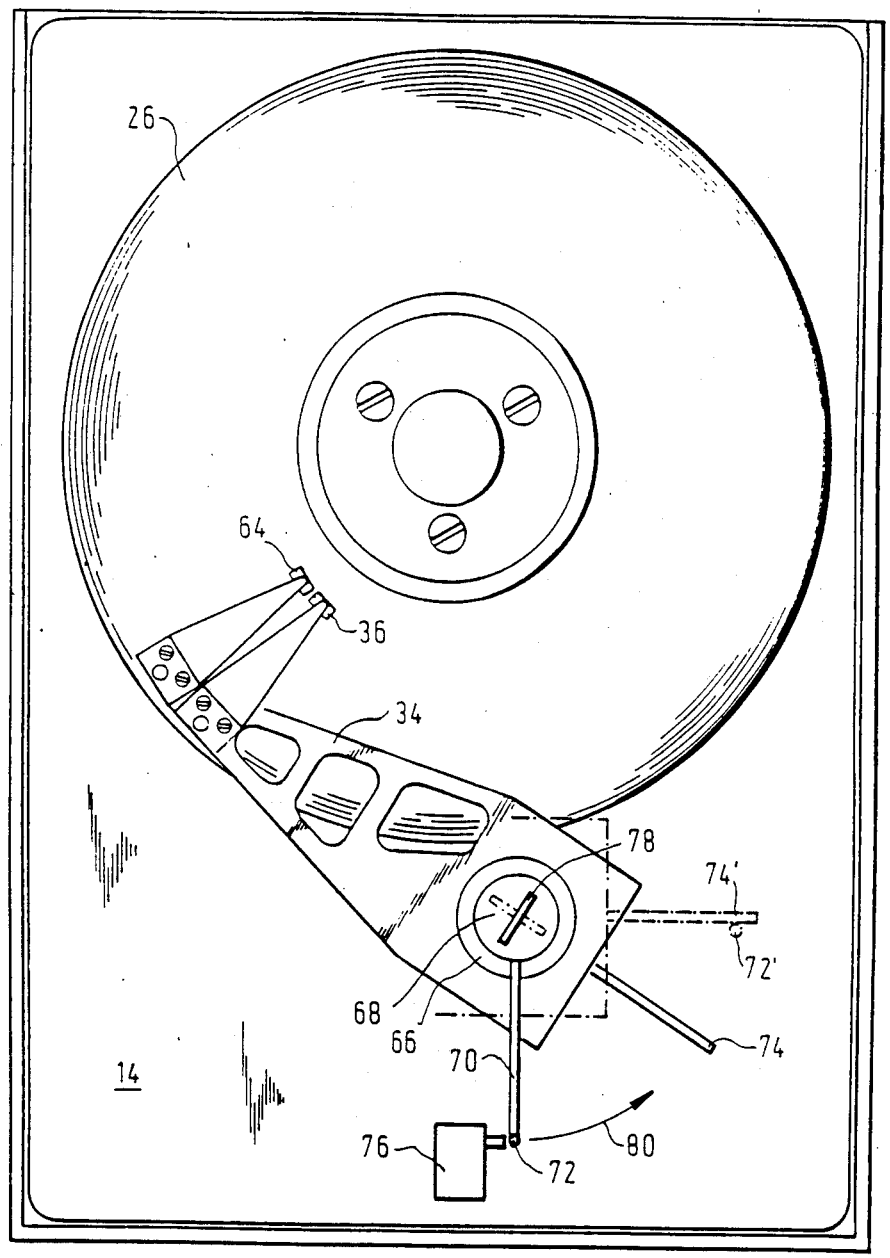
FIG. 3 shows a diagrammatic top plan view of a hard disk drive with magnetic heads and erase heads on the same carrier arrangement.

A third embodiment example of the hard disk drive according to the invention, finally, is represented in FIG. 3. Here too the same parts are designated with the same reference numbers as in the foregoing embodiment examples. An electromagnetic erase head 64 is arranged on the carrier arm 34 behind the magnetic head 36 in the drive direction. A shaft 68 is pivoted in the housing cap 14 above a pivoting shaft 66 of the carrier arm 34. An operating arm 70 is fastened in turn onto this shaft 68, the end 72, remote from the pivoting axis, of which arm is bent at a right angle downward, that is, away from the view of FIG. 3. A drive pin 74 fastened on the end of the carrier arm 34 remote from the magnetic head 36 is arranged so that the end 72 of the operating arm comes into contact with it when it is rotated in the direction of the arrow 80.

In its rest position the operating arm 70 actuates a microswitch which keeps the erase head 64 without current. If the operating arm 70 is now swung out of its rest position in the direction of the arrow 80 by means of a key 78 or the like, then the erase head 64 is energized with current through the microswitch 76, and the end 72 of the operating arm strikes the drive pin 74. With a further rotation of the key 78, the carrier arm 34, and with it the energized erase head 64, are swung over the whole disk region; in which the stored information is thereby erased. The outer extreme position of the arrangement is represented in dot-dash lines. If the key 78 is then turned back to its starting position, the carrier arm 34, driven by a restoring spring which is known in itself and therefore is not represented in detail, swings back into the rest position represented in solid lines. In the embodiment example described above with one electromagnetic erase head, the switching-on mechanism for the erase head is therefore lockable. A locking of this type can obviously also be provided in the embodiment example according to FIG. 2.

I claim:

1. A self-contained hard disk drive unit comprising:
   a driveable disk carrier having a plurality of magnetic disks mounted thereon such that each of said magnetic disks is substantially parallel and spaced with respect to the next adjacent disk, said disk carrier being adapted to rotate about a central axis;
   a regulating device mounted adjacent the disk carrier having a plurality of carrier arms with each of said arms having a magnetic read-write head, said regulating device including means for traversing each of said read-write heads across a respective one of said plurality of disks as said disk carrier rotates;
   a stationary air conduction comb mounted adjacent said regulating device, said comb having a plurality of fingers with each of said plurality of fingers being aligned with and positioned before a respective carrier arm with respect to the path of travel of said rotating disk to deflect contaminants to prevent said contaminants from reaching said read-write heads; and
   a plurality of activatable erasing means respectively on said comb fingers adjacent said disk, said erasing means being activatable to erase said disks as said disks rotate to provide an erased and substantially contaminant free disk to said respective read-write heads as said disk rotates.

2. The disk drive unit of claim 1 wherein each of said erasing means comprises an electromagnetic erase head.

3. The disk drive unit of claim 1, further including an enclosed housing within which said disk carrier, regulating device, air conduction comb and erasing means are operatively housed.

4. The disk drive unit of claim 1, wherein said fingers are closely adjacent said carrier arms to prevent contaminants from being deposited on said disk between said fingers and carrier arms.

5. The disk drive unit of claim 1, wherein said erasing means are embedded respectively within said comb fingers.

6. The disk drive unit of claim 1, wherein at least one of said plurality of erasing means extends over a portion of a respective one of said disks.

7. The disk drive unit of claim 1, wherein said disk carrier is manually rotatable through at least 360°.

8. The disk drive unit of claim 1, further including activating means for actuating said activatable erasing means, said activating means being lockable to prevent accidental erasing of said disks.

* * * * *